No. 762,486. PATENTED JUNE 14, 1904.
D. H. McCLELLAND.
OIL PURIFIER.
APPLICATION FILED JAN. 5, 1904.
NO MODEL.
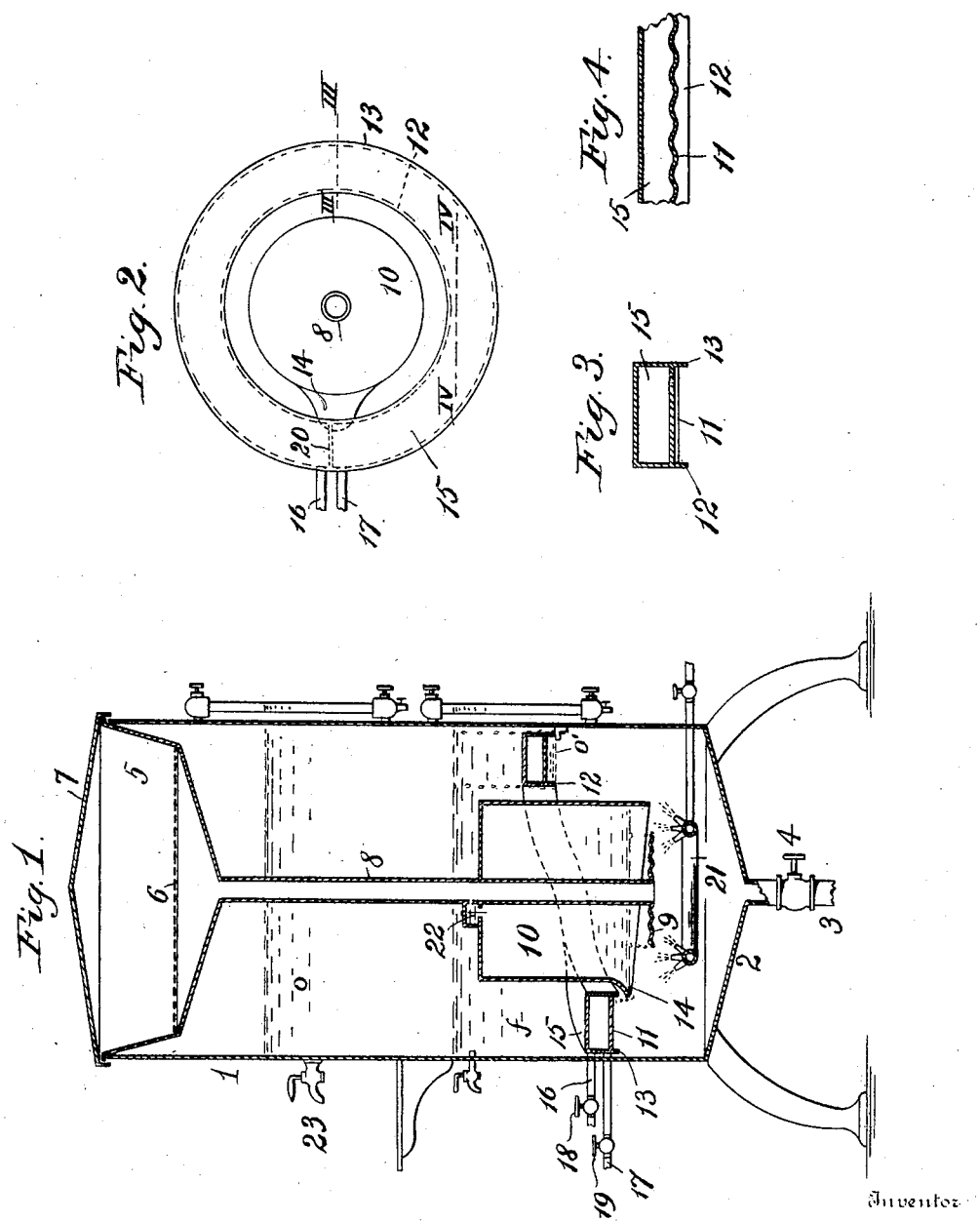

No. 762,486. Patented June 14, 1904.

UNITED STATES PATENT OFFICE.

DAVID H. McCLELLAND, OF NEW YORK, N. Y., ASSIGNOR OF ONE-HALF TO FRANCIS RISK, OF NEW YORK, N. Y.

OIL-PURIFIER.

SPECIFICATION forming part of Letters Patent No. 762,486, dated June 14, 1904.

Application filed January 5, 1904. Serial No. 187,806. (No model.)

*To all whom it may concern:*

Be it known that I, DAVID H. MCCLELLAND, a citizen of the United States, residing at New York city, in the county of New York and State of New York, have invented certain new and useful Improvements in Oil-Purifiers, of which the following is a specification.

My present improvements relate to that class of purifiers for oil, and especially for lubricating-oil, in which the impurities are separated by a washing process involving the passing of the foul oil through a purifying fluid, such as water, or any solution which may promote the separation of the oil from its impurities.

It is the object of this invention to more quickly and thoroughly effect such separation, and it comprises means for heating and expanding the oil as it passes in a thin film or in separated drops or small bodies through the purifying fluid.

It also comprises devices for lengthening as much as possible the passage of the oil through the purifying fluid, so as to give a more thorough washing to the oil and a longer time for the separation of the impurities.

In order to make my invention more clearly understood, I have shown in the accompanying drawings means for carrying the same into practical effect without limiting my improvements in their useful applications to the particular construction which for the sake of illustration I have delineated.

In said drawings, Figure 1 is a vertical sectional view of an oil-purifier embodying the invention. Fig. 2 is a plan view of the oil washing and heating device. Fig. 3 is a sectional view of the same on line III, Fig. 2. Fig. 4 is a sectional view on line IV, Fig. 2.

Referring to the drawings, 1 is a reservoir or tank adapted to contain in its lower part the purifying fluid $f$ and in its upper part the body of oil $o$, which has been purified and has risen through and above the surface of the fluid $f$. Said reservoir is provided with a funnel-shaped bottom 2, arranged to collect the impurities and converge the latter to a draw-off pipe 3, controlled by a valve 4. The pipe 3 leads to the sewer or other place of waste deposit.

At or within the upper end of the reservoir 1 is supported a receptacle 5 for the impure oil or oil-impregnated waste or other material, provided with a perforated or reticulated strainer-plate 6 and a removable cover 7. From the receptacle 5 an oil-pipe 8 leads down into the lower part of the reservoir and is adapted to deliver the foul oil below the surface of the purifying fluid $f$. In order to promote the immediate separation of all of the heavier impurities, I prefer that the lower part of the pipe 8 shall first deliver the foul oil under the washing-plate 9, from which the partly-purified oil may rise into a bell 10, carried by the pipe 8 and submerged in the fluid $f$. From the bell 10 the oil is delivered to the final washing and heating device. The latter consists of an annular washing-plate 11, extending around and within the reservoir in an inclined position and provided with inner and outer depending flanges 12 and 13, between which the oil is conducted while still in contact with the purifying fluid in a thin film or in separated drops along the under side of the plate 10 to the higher side of the latter. Here the purified oil accumulates at $o'$ until it finds its exit beneath one or both of the flanges 12 and 13 into the upper part of the fluid $f$, through which it rises to the body of oil $o$. The under side of the plate 11 may be plain or corrugated, the latter for the purpose of delaying the passage of and promoting the thorough washing of the oil, and the plate 11 as a whole has preferably each of its rising limbs or halves of the form of half a helix or of the form shown in Figs. 1 and 2. The delivery of the oil from the bell 10 to the under side of the plate 11 is preferably effected by providing the bell at the highest point of its bottom edge with a lateral toe or projection 14, extending beyond the flange 12. This arrangement does not interfere with the removal of the parts 5, 8, 9, and 10 as a connected whole from the reservoir, as in separating or assembling the parts the receptacle 5 may be slightly tilted to carry the projection 14 to a point within and out of line with the flange 12. I further provide for the direct heating of the oil in its final passage along the plate 11.

15 is a heating-chamber of which the plate 11 forms the bottom wall, extending along and above said plate and around and within the reservoir 1. This heating-chamber is adapted to receive a heating medium, such as steam or hot air, of such desired temperature as to fully expand the oil and separate it from any remaining impurities which may be intimately associated with it. Such heating medium is admitted to and taken from the chamber 15 at its lowest point by entrance and exit pipes 16 and 17, controlled by valves 18 and 19. At 20, between the pipes 16 and 17, the chamber 15 is provided with a partition 20 to compel a complete circulation of the heating medium through the chamber.

At 21 is arranged a washing or spray pipe through which steam or water may be supplied to clean out the reservoir and wash off the various oil holding and conducting devices, such waste passing down through the pipe 3.

22 is a check-valve arranged to allow the air within the bell 10 to escape and the bell to become filled with the purifying fluid when the apparatus is prepared for operation, such air passing up the pipe 8. The valve 22, however, prevents the foul oil from passing into the bell otherwise than under the plate 9. As the operation of the purifier continues the water within the bell 10 is displaced by oil in its partly-purified condition until such oil accumulates sufficiently to flow under the projection 14.

While my invention is capable of various important and advantageous uses, it is especially adapted for the recovery of waste lubricating-oil in engine-rooms and machine-shops and in connection with machinery generally, effecting a great economy.

The draw-off for the purified oil is shown at 23 and is situated at the other side of the reservoir from the point at which the oil rises from the washing device to the body $o$. This gives a final opportunity for the throwing down of impurities from the body at $o$ into the fluid $f$, extending through the whole space of time during which the oil at $o$ is gradually passing from one side of the reservoir to the other—that is, to the draw-off 23. This is especially desirable in purifiers in which the oil is washed without heating or by devices less thorough and effective than those herein described.

I am aware that it is not new to heat the oil to be purified while the same is in motion along a washing plate or surface immersed in a purifying fluid by heating such purifying fluid; but according to my invention the washing plate or surface is directly heated irrespective of what amount of heat be imparted to the purifying fluid, and the oil is heated by such plate as it passes along under the plate in particles, drops, or films. The oil is thus heated irrespective of what amount of heat be imparted to the purifying fluid and ordinarily to a higher temperature than is the said fluid.

What I claim is—

1. In an oil-purifier the combination of a reservoir for a purifying fluid, means for delivering oil to be purified into and below the surface of said fluid, a washing-plate along which the oil is adapted to pass while in said fluid, and means irrespective of the said fluid for directly heating said plate, substantially as set forth.

2. In an oil-purifier the combination of a reservoir for a purifying fluid, means for delivering oil to be purified into and below the surface of said fluid, a washing-plate in said fluid, a heating-chamber immediately above said plate and means irrespective of said fluid for heating said chamber and plate, the plate being arranged to receive on its under surface the oil so delivered, substantially as set forth.

3. In an oil-purifier the combination of a reservoir for a purifying fluid, means for delivering oil to the purifier into and below the surface of said fluid, an inclined washing-plate along which the oil is adapted to pass while in said fluid, and means irrespective of said fluid for directly heating said plate, substantially as set forth.

4. In an oil-purifier the combination of a reservoir for a purifying fluid, oil-conducting devices for delivering oil to be purified into and below the surface of said fluid, means for causing the oil to be divided into small particles or bodies while passing through the fluid, and means irrespective of said fluid for heating such particles of the subdivided oil, substantially as set forth.

5. In an oil-purifier the combination of a reservoir for a purifying fluid, means for delivering oil to be purified into and below the surface of said fluid, and an inclined annular washing-plate, having depending flanges, arranged to receive at its lowest part the oil so delivered, and having contiguously above it the heating-chamber 15, substantially as set forth.

6. In an oil-purifier the combination of a reservoir for a purifying fluid, means for delivering oil to be purified into and below the surface of said fluid, an inclined annular washing-plate extending around and within the lower part of the reservoir and arranged to receive the oil so delivered, and a chamber closed to the purifying fluid for heating said plate, substantially as set forth.

7. In an oil-purifier the combination with the reservoir, of the washing-plate 11 and heating-chamber 15 of which the washing-plate forms the bottom wall, and means for delivering oil beneath said plate, substantially as set forth.

8. In an oil-purifier the combination of a reservoir, a washing-plate held therein, a removable oil-receptacle at the upper part of the reservoir, and an oil-conduit attached to said receptacle and extending to a point directly underneath a part of said washing-plate, substantially as set forth.

In testimony whereof I affix my signature in presence of two witnesses.

DAVID H. McCLELLAND.

Witnesses:
H. N. Low,
Geo. B. Pitts.